United States Patent [19]

Krause

[11] Patent Number: 4,620,244

[45] Date of Patent: Oct. 28, 1986

[54] COMPENSATION METHOD TO CORRECT THERMALLY INDUCED OFF-TRACK ERRORS IN DISC DRIVES

[75] Inventor: James N. Krause, Santa Clara County, Calif.

[73] Assignee: Seagate Technology, Scotts Valley, Calif.

[21] Appl. No.: 800,061

[22] Filed: Nov. 20, 1985

[51] Int. Cl.⁴ .................................. G11B 5/55
[52] U.S. Cl. ......................... 360/77; 360/78
[58] Field of Search ............... 318/634; 360/75, 77, 360/78

[56] References Cited

U.S. PATENT DOCUMENTS

| | | | |
|---|---|---|---|
| 4,122,503 | 10/1978 | Allan | 360/78 |
| 4,136,365 | 1/1979 | Chick et al. | 360/78 |
| 4,445,153 | 4/1984 | Fujimoto et al. | 360/77 |
| 4,499,510 | 2/1985 | Harding et al. | 360/77 |

Primary Examiner—George G. Stellar
Attorney, Agent, or Firm—Flehr, Hohbach, Test, Albritton & Herbert

[57] ABSTRACT

A thermal test tract is provided outside the user-accessible area on the disc. A tack complete of a known frequency is then written on the either side of this thermal test track, preferably half the usual track separation distance away. To develop a thermal compensation constant, the transducer is moved to the thermal test track with no compensation applied. In this way, any thermally induced off-track error, which would affect seeks to user-accessible data tracks, will be reflected in the off-track from the nominal position of the thermal test track. The transducer is now moved in a series of defined increments smaller than normal track-to-track steps, or "micro-steps," away from the uncompensated position of the thermal track toward one of the tracks written with the known frequency. When the data on the written track to the side of the thermal test track is detected, a note is made of the number of micro-steps the transducer has been moved. The transducer is then micro-stepped incrementally in the opposite direction until the data written on the other side of the thermal test track is detected. A simple comparison of these two micro-step counts will yield the existing thermal shift, which can be converted into a thermal compensation constant for the transducer positioning mechanism by means of a simple look-up table.

15 Claims, 4 Drawing Figures

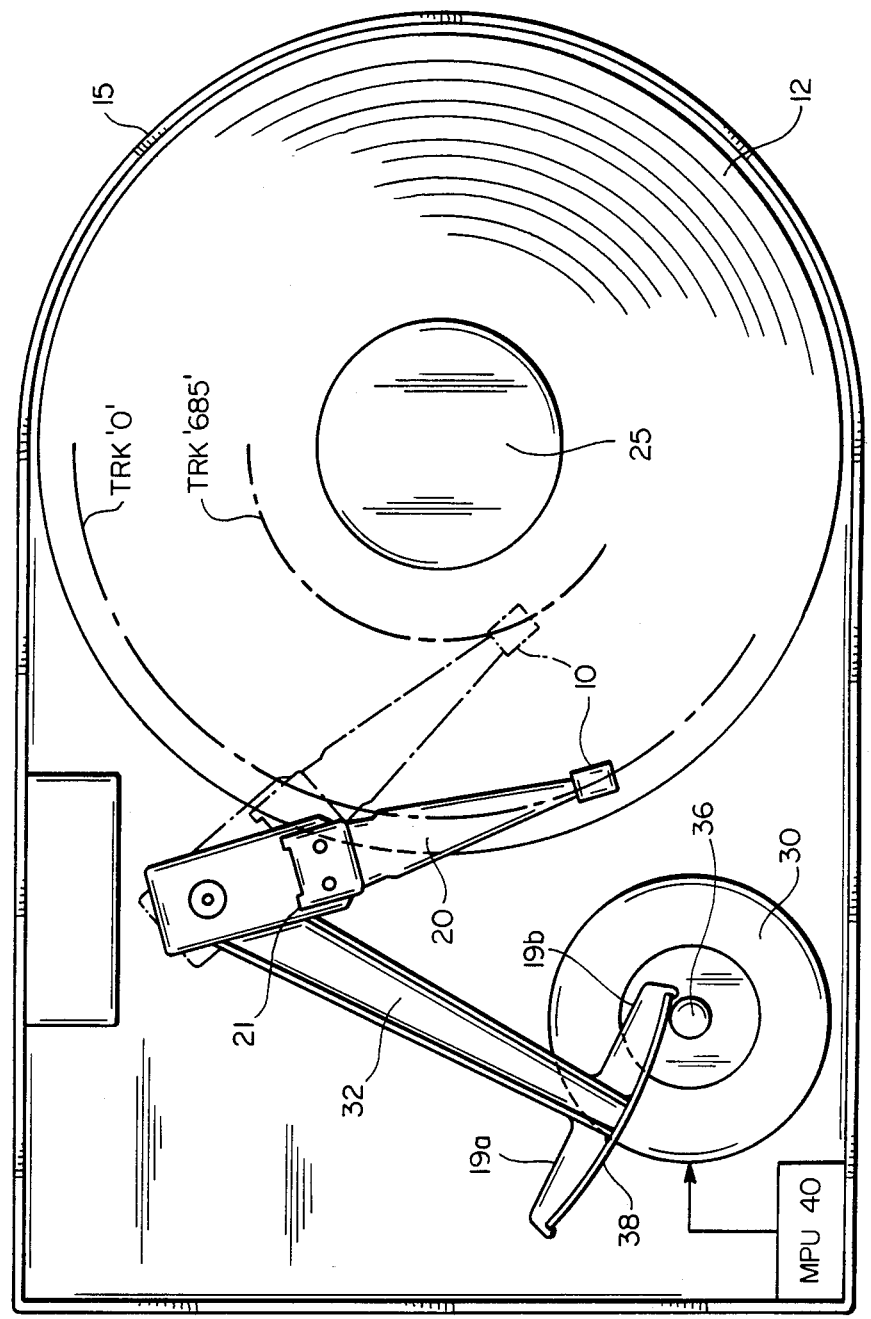
FIG_1

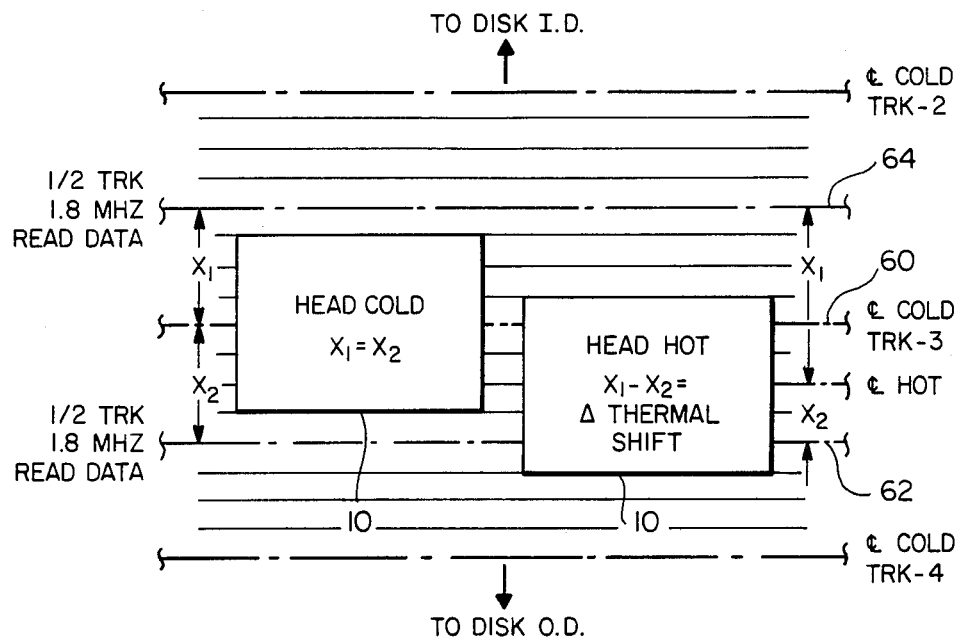
FIG_2
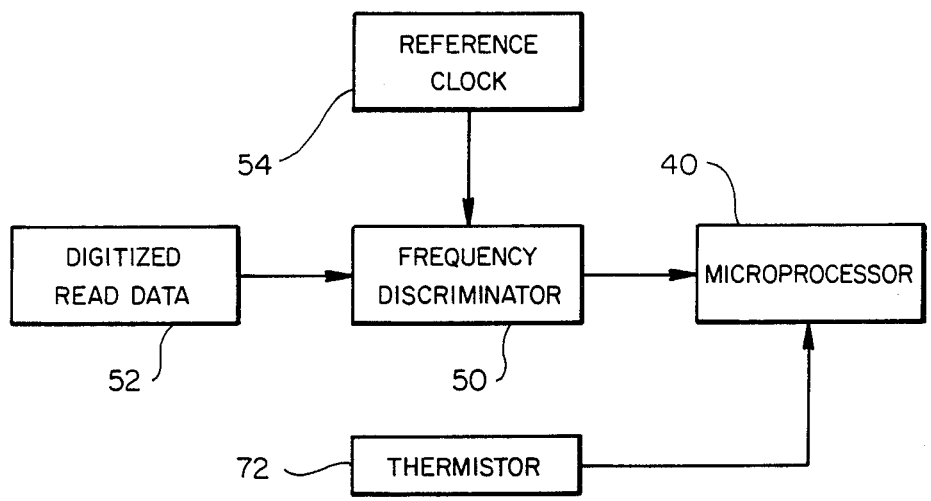
FIG_3

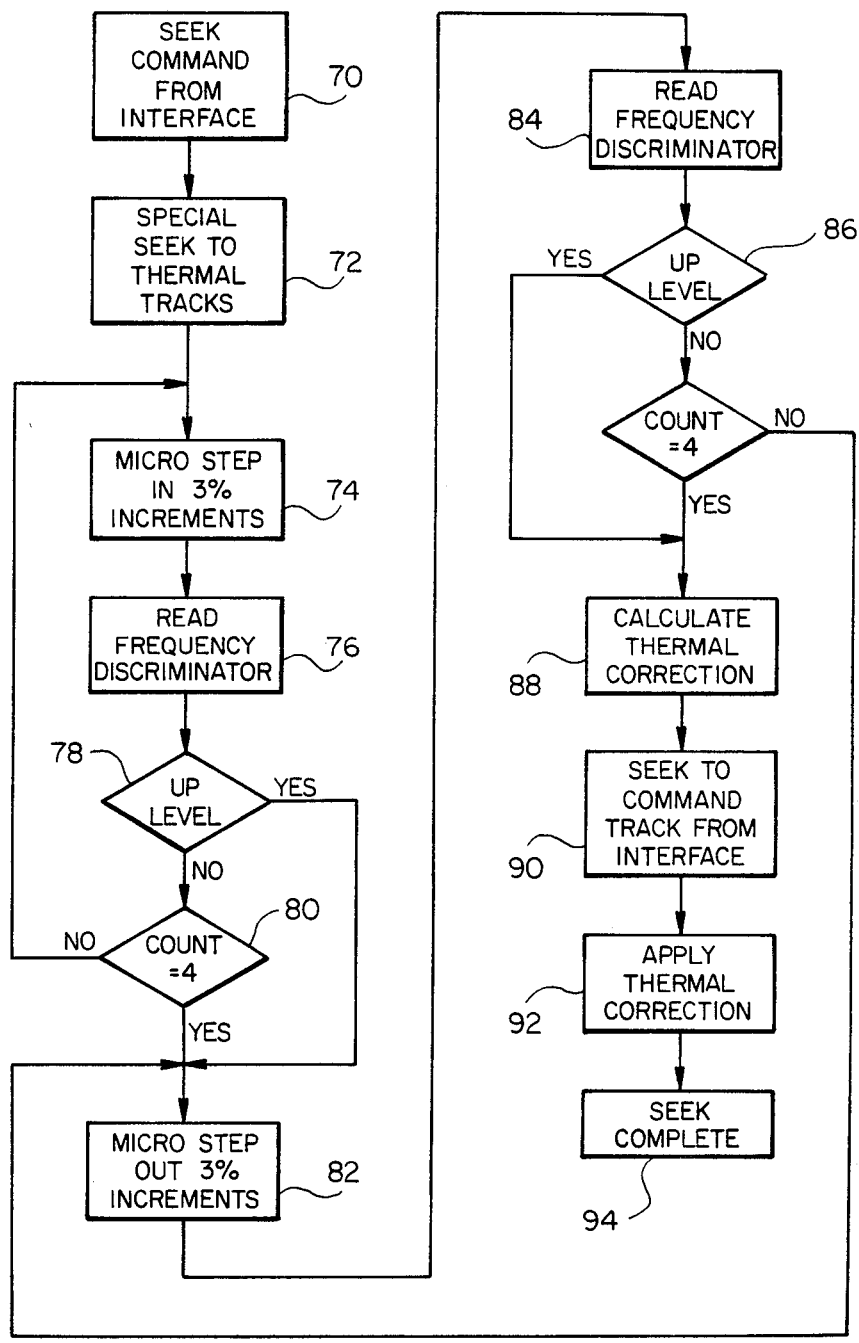
FIG_4

COMPENSATION METHOD TO CORRECT THERMALLY INDUCED OFF-TRACK ERRORS IN DISC DRIVES

This invention relates generally to magneticc disc memory apparatus and particularly to temperature compensation in the transducer positioning system in a disc drive.

Disc drive machines record and reproduce information stored on concentric circular tracks recorded on magnetic discs. The tracks are written and read by a magnetic transducer which cooperates with the surface of the disc. Many disc drives today employ pulley band mechanisms driven by stepper motors to position the read/write heads. For example, a detailed disclosure of a disc drive and especially the linear actuator for positioning the heads in alignment with a selected track on a disc is found in U.S. Pat. No. 4,323,939; a rotary actuator positioned by a stepper motor is found in application Ser. No. 613,163 filed May 23, 1984. Both are assigned to the Assignee of this invention and are incorporated herein by reference.

Such drives convert rotary motion of the stepper motor shaft to linear or rotary motion of a carriage which moves the transducers carried on an end of the carriage across the disc to read and record data on concentric circular disc tracks. The drive band is wrapped around the motor shaft pulley attached to the shaft, and has its ends attached to the carriage. Rotation of the shafts wraps one end of the band on the pulley and unwraps the other, causing the carriage to move the head from track to track.

Industry requirements for greater storage capacities in ever decreasing physical package sizes demand that the tracks be spaced as closely adjacent to one another as possible.

However, this creates the problem that the heads must be very accurately positioned relative to each track, so that the heads do not land on an incorrect track or too far from the center line of a desired track. A particularly difficult situation occurs in relatively low cost rigid disc drives; in order to achieve a significant reduction in cost and complexity as demanded by the competitive nature of the business, the head actuator which positions the transducer relative to the track does not incorporate any closed loop positioning control.

Therefore, it is an objective of this invention to provide a disc drive positioning mechanism which minimizes positioning error without any closed loop feedback control system.

Because of the wide range of operating environments in which a disc drive may be utilized, it has been found that one of the critical sources of mistracking error in the positioning of the head relative to the desired track is thermal expansion and contraction of the various components with changes in the ambient temperature. This is due to the fact that it is extremely difficult to properly match thermal expansion coefficients of the different materials which must be used in the construction of the disc drive, particularly its baseplate, spindle motor and the transducer positioning actuator. As has been already noted, the thermal off-track problem is particularly severe in an open loop drive which is common to the lower cost rigid disc industry; there is no track following servo to insure that the head is centered on the desired track, or to indicate that this tracking has occurred. The mistracking problem which may be created by variations in ambient temperature does not become evident until data has been incorrectly read or written, and even at that time, no inherent self-correction means exist.

Therefore, it is an objective of this invention to provide a disc drive with means to limit thermally induced off-track errors.

Thermal off-track error may be corrected, for example, by introducing additional components with varying thermal expansion rates in the positioning mechanism; however, this typically results in increased device costs.

It is an objective of this invention to provide an improved thermal off-track compensation system.

To minimize the cost of added components, another objective of this invention is to use the positioning electronics already provided in the disc drive system to provide a method for compensating for thermal mistracking error with changes in ambient temperature.

These and other objectives of this invention are provided by defining a thermal test track outside the user-accessible area on the disc. A track complete of a known frequency is then written on either side of this thermal test track, preferably half the usual track separation distance away. To develop a thermal compensation constant, the transducer is moved to the thermal test track with no compensation applied. In this way, any thermally induced off-track error, which would affect seeks to user-accessible data tracks, will be reflected in the off-track from the nominal position of the thermal test track. The transducer is now moved in a series of defined increments smaller than normal track-to-track steps, or "microsteps," away from the uncompensated position of the thermal track toward one of the tracks written with the known frequency. When the data on the written track to the side of the thermal test track is detected, a note is made of the number of microsteps the transducer has been moved. The transducer is then micro-stepped incrementally in the opposite direction until the data written on the other side of the thermal test track is detected. A simple comparison of these two micro-step counts will yield the existing thermal shift, which can be converted into a thermal compensation constant for the transducer positioning mechanism by means of a simple look-up table.

Of course, some time is required to carry out this thermal correction function. Therefore, in a preferred embodiment of the invention, to minimize the time lost in performing this function during a seek operation, the function is only carried out when a thermistor which is incorporated in the disc drive registers a change in ambient temperature of, for example, 5°–10° C.

The invention can be better understood together with its advantages and features by reference to the accompanying drawings wherein:

FIG. 1 is a plan view of a stepper motor driven actuator and data recording disc in which this invention may be incorporated;

FIG. 2 is a layout of an example of the thermal test track and adjacent data tracks used in the thermal compensation system of this invention;

FIG. 3 is a simple block diagram of the electrical elements in the disc drive controller system which are used to carry out the operating sequence of this invention; and FIG. 4 is a flow diagram of the sequence of steps which is utilized to carry ot the thermal compensation and correction features of this invention.

Referring particularly to FIG. 1, it shows a transducer 10 which is mounted on a flexure 20 attached to an actuator arm 21 to be positioned by a movement of a drive arm 32 on any data track of a disc 12. The disc 12 is driven in constant rotation by a spindle motor 25. The positioning of the actuator is carried out by the stepper motor 30 which drives a pulley 36 connected through a flexible band 38 to the head portions 19a, 19b of the actuator arm 32. With rotation of the motor pulley 36, the portion of flexible band 38 wind and unwind on the pulley 36, moving the transducer 10 from the track to track. This is accomplished under control of the microprocessor 40 which is shown schematically in the corner of the disc drive; this provides the control signals to the steppeer motor 30 in response to externally received seek commands. Such seek commands are received whenever the transducer is to be moved from its current position to a newly addressed track.

Referring now to FIG. 2, a thermal test track is defined at an area of the disc surface not accessible to the user of the disc, in this example, outside of track 0 (i.e., toward the outer diameter of disc 12). As shown in detail in FIG. 2, the thermal test track in this example is track −3. A constant frequency level, selected in this case to be 1.8 MHz is written ⅛ track distance away from the center of the thermal test track on each side of the track.

As noted above, it would be impractical to determine the thermal compensation factor for every seek operation. This would greatly slow down user accesses to the disc drive. Instead, there is a set of temperature sensing logic incorporated in this invention and shown generally as thermistor circuits 72 on FIG. 3. Included in the thermistor circuits 72 is a thermistor or other temperature sensing device and associated circuitry for determining when a temperature change has occurred which exceeds a preselected significant range. This range, in the example, has been set at 5° C. intervals. When the temperature monitoring circuitry determines that the operating temperature has increased or decreased beyond this 5° C. range, a logic flag is set in the thermistor circuits 72 and remains set until acknowledged and cleared by the microprocessor 40. This acknowledgement will not occur until the host computer in the system employing the disc drive commands the disc drive to seek to a new track.

This sequence of events is perhaps best understood in conjunction with the flow diagram of FIG. 4. Upon receipt of the seek command 70, the microprocessor will poll the logic flag in the thermistor circuits 72 to determine if the operating temperature of the disc drive has changed significantly (more than 5° C.) since the last prior seek command (step 71). As the flow diagram of FIG. 3 clearly shows, if no significant temperature change has occurred (i.e., the flag is not set), the disc drive seeks to the addressed track (step 90) applying the thermal correction last obtained (step 92). If, however, the flag is set, the microprocessor then clears the flag (step 72) and enters the sequence to determine a new thermal compensation factor by initiating a special seek to the thermal test track 60 (step 73).

When the head is moved to the thermal test track 60 without any compensation being made for thermal expansion or contraction, it will still be positioned between the two test data tracks (62, 64 of FIG. 2) prerecorded with the known frequency.

Once the head is landed at track 60, the first microstep toward one of the special data rack 62, 64 is taken as shown at block 74. The frequency discriminator 50 is read, as shown at step 76. If an up level is detected, the head has already reached the test data track 62 or 64 and the count used to reach that position is stored. As shown in the decision block 78, if no data has yet been read, a further step is taken and the sequence returns to block 74. Only four steps are taken in the search for the recorded data level. This is because a series of four microsteps, each equivalent to 3% of the track-to-track distance, will represent 12% of the distance between tracks (or 24% of the distance between the thermal test track 60 and the test data tracks 62, 64), and the mechanical design of the disc drive is such that greater errors cannot be thermally induced.

Closer examination of FIG. 2 will yield a greater appreciation of this. In disc drives designed using current technology, a guard band is included between adjacent tracks which is approximately 20% of the track-to-track distance. If the two test data tracks 62, 64 are thought of as normal data tracks, then the thermal test track 60 will be located at the center of the guard band between the two recorded known frequencies, with a maximum of 10% of this guard band on either side of the nominal position of the thermal test track.

After locating the first of the test data tracks, the microstepper proceeds to return to the thermal track 60 and step in the opposite direction looking for a written data track. This is shown at blocks 81, 82. Again, with each microstep in the direction of the opposite test data track, the frequency discriminator is read as shown at step 84 looking for an up level as shown at step 86. When the test data track is found, the count of microsteps is stored. Based on the data stored from these sequences of tranducer steps and readings generated by the frequency discriminator 50, a thermal correction can be calculated at 88.

The transducer 10 is now moved to the commanded track as shown in block 90. When the track is reached, the developed thermal correction is applied as shown at step 92 to accurately position the transducer 10 over the track.

The seek sequence is now complete, and the thermal correction is stored so that until another significant shift in ambient temperature occurs, the same thermal correction can be applied in each instance.

A person of skill in the disc drive art who studies this invention disclosure may realize that modification can be made to the preferred embodiment which has been described above. For example, a track of test data may be written on only one side of the thermal test track 60, or the development of a thermal compensation constant may be carried out at regular intervals, rather than with significant changes in ambient temperature. Therefore, the scope of the present invention is to be limited only by the following claims.

What is claimed:

1. A method for correction of thermal mistracking in a disc drive comprising a rotating disc characterized by a plurality of spaced circular tracks for storing recorded data, actuator means for accessing the data comprising a carriage, means for mounting a transducer at one end of the carriage, means adjacent the periphery of the rotating disc for driving and positioning the carriage along a known path to position the transducer relative to the disc and the tracks, the method comprising the steps of defining a selected thermal test track on said disc at a location on said disc not accessible to the user, recording a reference signal along a track on at least one side of said test track, moving said transducer with no thermal correction applied to said thermal test track, moving said transducer in known incremental movements from said thermal test track toward said reference signal to detect said reference signal, operating on said information derived from said incremental movements to determine thermal shift of said transducer relative to said tracks on said disc and applying the knowledge of said determined thermal shift to subsequent seeks to user-accessible data tracks.

2. A method as in claim 1 including the step of recording a reference signal on either side of the test track, moving said transducer toward each of said reference signal positions to detect the recorded signal, and calculating the thermal shift of said transducer relative to said disc tracks.

3. A method as in claim 2 wherein no signal is recorded on said test track, said tranducer reading only noise when centered on said test track.

4. A method as in claim 2 wherein said moving step is carried out in a series of incremental steps toward the location of said recorded signal.

5. A method as in claim 4 wherein said reference signal is recorded along a line about ½ of the distance between the thermal test track and the next adjacent track on the disc.

6. A method as in claim 1 wherein said moving step is carried out in a series of incremental steps toward the location of said recorded signal.

7. A method as in claim 6 wherein said reference signal is recorded along a line about ½ of the distance between the thermal test track and the next adjacent track on the disc.

8. A method as in claim 1 wherein the disc drive includes a temperature sensing means for monitoring the operating temperature of the drive, said method including the steps of periodically sensing the ambient temperature of the disc drive, and moving the transducer to the test track in response to sensing a defined change in ambient temperature.

9. A method as in claim 8 wherein said defined change in ambient temperature is at least 5° C.

10. A method for correction of thermal mistracking in a disc drive comprising a rotating disc characterized by defining a selected thermal test track on said disc, recording a reference signal along a track on at least one side of said thermal test track, moving said transducer to said test track moving said transducer from said track toward said reference signal to detect said reference signal, operating on said information derived from said incremental movements to determine thermal shift of said transducer relative to said tracks on said disc, during seek cycles of the transducer periodically moving said transducer to said test track, developing a compensation constant to accurately position said transducer over one of said data tracks at the end of said seek cycle by the steps of moving said transducer from said test track toward each of said recorded reference signals to detect the reference signal recorded thereon, determining the distance moved toward each of said tracks from said test track, and developing the compensation constant from said distance.

11. A method as in claim 10 wherein no signal is recorded on said test track, said transducer reading only noise when centered on said test track.

12. A method as in claim 11 wherein said moving step is carried out in a series of incremental steps toward the location of said recorded signal.

13. A method as in claim 12 wherein said reference signal is recorded along a line about ½ of the distance between the thermal test track and the next adjacent track on the disc.

14. A method as in claim 13 wherein the disc drive includes a temperature sensing means for monitoring the operating temperature of the drive, said method including the steps of periodically sinsing the ambient temperature of the disc drive, and moving the transducer to the test track in response to sensing a defined change in ambient temperature.

15. A method as in claim 12 wherein said transducer moving function is carried out in a sequence of at least four steps.

* * * * *